United States Patent [19]

Hoehn et al.

[11] 3,894,005
[45] July 8, 1975

[54] HYDRAZONES OF PYRAZOLO[3,4-B]PYRIDINES

[75] Inventors: Hans Hoehn, Tegernheim; Ernst Schulze, Regensburg, both of Germany

[73] Assignee: E. R. Squibb & Sons, Inc., Princeton, N.J.

[22] Filed: May 24, 1974

[21] Appl. No.: 473,122

[52] U.S. Cl.... 260/240 G; 260/296 H; 260/295.5 B
[51] Int. Cl. ...................... C07d 31/42; C07d 39/00
[58] Field of Search ........ 260/240 G, 296 H, 296 T, 260/295.5 B

[56] References Cited
UNITED STATES PATENTS 3,773,777  11/1973  Hoebn et al. ............... 260/240 G X
3,847,929  11/1974  Denzel et al. .................... 260/296 H Primary Examiner—Allen B. Curtis
Attorney, Agent, or Firm—Lawrence S. Levinson; Merle J. Smith

[57] ABSTRACT

New hydrazones of pyrazolo[3,4-b]pyridines have the general formula:

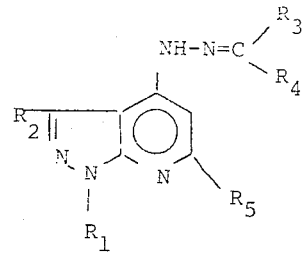

They are useful as anti-inflammatory agents. In addition, this type of compound increases the intra-cellular concentration of adenosine-3',5-cyclic monophosphate.

12 Claims, No Drawings

HYDRAZONES OF PYRAZOLO[3,4-b]PYRIDINES

SUMMARY OF THE INVENTION

This invention is related to new hydrazones of pyrazolo[3,4-b]pyridines which have the general formula (I)

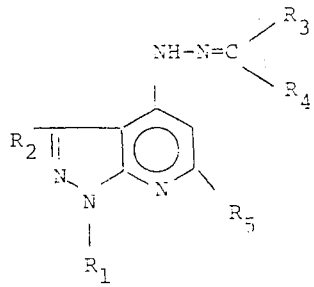

The symbols have the following meanings in formula I and throughout this specification.

$R_1$ is lower alkyl or phenyl-lower alkyl.

$R_2$ is hydrogen or lower alkyl.

$R_3$ is lower alkyl, phenyl or substituted phenyl and $R_4$ is hydrogen or lower alkyl, phenyl or substituted phenyl, or $R_3$ and $R_4$ together complete a $C_3$ to $C_6$ cycloaliphatic ring including cyclopropyl, cyclobutyl, cyclopentyl or cyclohexyl rings.

$R_5$ is hydrogen, lower alkyl or phenyl.

The phenyl substituents in the substituted phenyl groups are halogen, lower alkyl or carboxy.

The lower alkyl groups are all straight or branched chain hydrocarbons group of up to seven carbon atoms, preferably $C_1$–$C_4$ alkyl and especially methyl and ethyl.

Preferred are those compounds wherein $R_1$ is lower alkyl, especially ethyl, $R_2$ is hydrogen or lower alkyl, especially methyl or ethyl, $R_3$ is hydrogen or lower alkyl, especially methyl or propyl; $R_4$ is lower alkyl, especially methyl or propyl, or phenyl; and $R_5$ is hydrogen, methyl or phenyl, especially hydrogen.

DETAILED DESCRIPTION OF THE INVENTION

The new compounds of formula I are formed by the following series of reactions. The symbols in the structural formulas have the same meanings as previously described.

A 5-aminopyrazole of the formula (II)

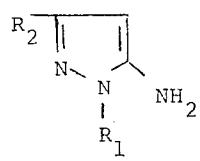

[prepared according to the procedure described in Z. f. Chemie 10, 386–388 (1970)] is made to react with an acyl acetic acid ester of the formula:

(III)

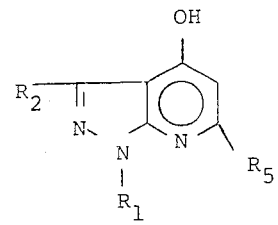

by heating at a temperature of about 120° to 140°C. in the presence of polyphosphorous acid producing a compound of the formula (IV)

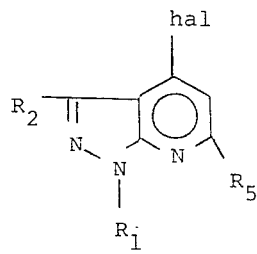

Subsequently, this 4-hydroxy compound of formula IV is refluxed for several hours with a phosphorous halide like phosphorous oxychloride to yield the intermediate of the formula (V)

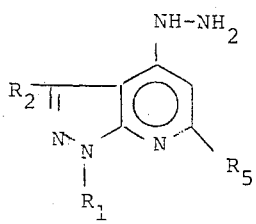

Reaction of the halogenated compound of formula V with hydrazine leads to the compound of the formula (VI)

The hydrazones of formula I are then produced from the compounds of formula VI with the appropriate aldehyde or ketone of the formula (VII)

$$R_3-\overset{\overset{\text{O}}{\|}}{C}-R_4$$

This reaction is effected by treating the reactants at room or elevated temperatures.

An alternate route to compounds of formula I is the decarboxylation of hydrazones of pyrazolo[3,4-b]pyridine-5-carboxylic acids of the formula (VIII)

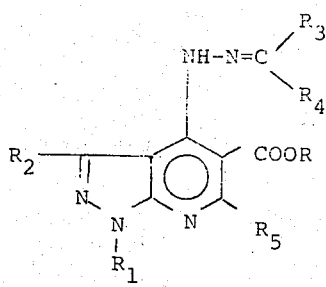

in which R represents hydrogen. Starting compounds used for this reaction are esters (R=lower alkyl) which can be prepared according to J. Heterocycl. Chem. 9, 235 (1972) or U.S. Pat. No. 3,773,777, Nov. 20, 1973. The ester is saponified, e.g., with a base like sodium hydroxide, and the saponified ester (R=H) is heated to about 200° to 240° with or without a solvent. This operation results in decarboxylation and yields the hydrazone of formula I.

The compounds of formula I form salts which are also part of this invention. The salts include acid addition salts, particularly the non-toxic, physiologically acceptable members. The bases of formula I form salts by reaction with a variety of inorganic acids providing acid addition salts including, for example, hydrohalides (especially hydrochloride and hydrobromide), sulfate, nitrate, borate, phosphate, oxalate, tartrate, malate, citrate, acetate, ascorbate, succinate, benzenesulfonate, methanesulfonate, cyclohexanesulfamate and toluenesulfonate. The acid addition salts frequently provide a convenient means for isolating the product, e.g., by forming and precipitating the salt in an appropriate menstruum in which the salt is insoluble, then after separation of the salt, neutralizing with a base such as barium hydroxide or sodium hydroxide, to obtain the free base of formula I. Other salts may then be formed from the free base by reaction with an equivalent of acid.

The new compounds of this invention have antiinflammatory properties and are useful as antiinflammatory agents, for example, to reduce local inflammatory conditions such as those of an edematous nature or resulting from proliferation of connective tissue in various mammalian species such as rats, dogs and the like when given orally in dosages of about 5 to 50 mg/kg/day, preferably 5 to 25 mg/kg/day, in single or 2 to 4 divided doses, as indicated by the carageenan edema assay in rats. The active substance may be utilized in compositions such as tablets, capsules, solutions or suspensions containing up to about 200mg per unit of dosage of a compound or mixture of compounds of formula I or physiologically acceptable acid addition salt thereof. They may be compounded in conventional manner with a physiologically acceptable vehicle or carrier, excipient, binder, preservative, stabilizer, flavor, etc. as called for by accepted pharmaceutical practice. Topical preparations containing about 0.01 to 3 percent by weight of active substance in a lotion, salve or cream may also be used.

The new compounds also increase the intracellular concentration of adenosine-3',5'-cyclic monophosphate, and thus by the administration of about 1 to 100 mg/kg/day, preferably about 10 to 50 mg/kg, in single or two to four divided doses in conventional oral or parenteral dosage forms such as those described above may be used to alleviate the symptoms of asthma.

The following examples are illustrative of the invention and constitute especially preferred embodiments.

Other members of the group are prepared in similar manner by appropriate substitution of the reactants.

EXAMPLE 1

1-Ethyl-3-methyl-6-phenyl-4-[2-(benzylidene)hydrazino]-1H-pyrazolo[3,4-b]pyridine a. 1-Ethyl-4-hydroxy-3-methyl-6-phenyl-1H-pyrazolo[3,4-b]pyridine 96 g. of benzoylacetic acid ethyl ester (0.5 mol.) are added dropwise to a stirred mixture of 62.5 g. of 5-amino-1-ethyl-3-methylpyrazole (0.5 mol.) and 250 g. of polyphosphorous acid and heated to 130°C. After the reaction has occurred which can be recognized by the changing of the color, the whole is heated for half an hour at 130°C. After the mixture has cooled to room temperature, 600 ml. of water are added and stirring is continued until the compound becomes crystalline. The collected 1-ethyl-4-hydroxy-3-methyl-6-phenyl-1H-pyrazolo[3,4-b]pyridine is treated with dilute aqueous ammonia, washed with water, alcohol and ether; yield=75.8 g. (60%), m.p. 251.5°–253.5°C. (abs. ethanol).

b. 4-Chloro-1-ethyl-3-methyl-6-phenyl-1H-pyrazolo[3,4-b]pyridine 147.5 g. of 1-ethyl-4-hydroxy-3-methyl-6-phenyl-1H-pyrazolo[3,4-b]pyridine (0.58 mol.) are refluxed in 1000 ml. of phosphorous oxychloride for 6 hours. The excess phosphorous oxychloride is removed in vacuo and the oily residue is treated with ice-water by which operation the compound becomes solid. The 4-chloro-1-ethyl-3-methyl-6-phenyl-1H-pyrazolo[3,4-b]pyridine is extracted with ether, washed with aqueous sodium carbonate solution (10%) and again with water. The ether extract is dried over sodium sulfate and treated with charcoal yielding 152.5 g. (96%) of the product; m.p. 778°–80°C. (cyclohexane).

c. 1-Ethyl-4-hydrazino-3-methyl-6-phenyl-1H-pyrazolo[3,4-b]pyridine 54.3 g. of 4-chloro-1-ethyl-3-methyl-6-phenyl-1H-pyrazolo[3,4-b]pyridine (0.2 mol.) are added to 20 g. of hydrazine hydrate (0.4 mol.) and the whole is heated at 190°–200°C. in an autoclave for 21 hours. After cooling, the solution is evaporated in vacuo and the residue is treated with water and then extracted with ether. The ether extract is dried ($Na_2SO_4$) and treated with charcoal giving after evaporation a brown product, 1-ethyl-4-hydrazino-3-methyl-6-phenyl-1H-pyrazolo[3.4-b]pyridine, which is recrystallized from cyclohexane, yield: 24.7 g. (46.3%); m.p. 154.5°–156.5°C.

d. 1-Ethyl-3-methyl-6-phenyl-4-[2-(benzylidene)hydrazino]-1H-pyrazolo[3,4-b]pyridine To 15 g. of 1-ethyl-4-hydrazino-3-methyl-6-phenyl-1H-pyrazolo[3,4-b]pyridine (0.056 mol.) dissolved in 500 ml. of absolute ethanol, 6.5 g. of benzaldehyde (0.056 mol.) are added and the whole is refluxed for two hours. While heating the hydrazone begins to precipitate, which increases in amount on cooling. After standing overnight, the 1-ethyl-3-methyl-6-phenyl-4-[2-benzylidenehydrazino]-1H-pyrazolo[3,4-b]pyridine is filtered off. With the quantity obtained from the mother liquor, the yield amounts to 19.8 g. (99.5%); m.p. 213°–214°C. (absolute ethanol).

EXAMPLE 2

1-Ethyl-4-[2-(p-chlorobenzylidene)hydrazino]-1H-pyrazolo[3,4-b]Pyridine a. 1-Ethyl-4-[2-(4-chlorobenzylidene)hydrazino]-

1H-pyrazolo[3,4-b]pyridine-5-carboxylic acid ethyl ester 24.9 g. of 1-ethyl-4-hydrazino-1H-pyrazolo[3,4-b]pyridine-5-carboxylic acid ethyl ester (0.1 mol.), prepared according to J. Heterocycl. Chemie 9, 235 (1972), and 15.5 g. of p-chlorobenzaldehyde (0.11 mol.) dissolved in 300 ml. of absolute ethanol are refluxed for 3 hours. Upon cooling, the hydrazone begins to crystallize. The mixture, after having been allowed to stand overnight, is filtered off. The dried 1-ethyl-4-[2-(4-chlorobenzylidene)hydrazino]-1H-pyrazolo[3,4-b]pyridine-5-carboxylic acid ethyl ester amounts to 34.8 g. (93.5%); m.p. 166°–167°C. (absolute ethanol).

b. 1-Ethyl-4-[2-(4-chlorobenzylidene)hydrazino]-1H-pyrazolo[3,4-b]pyridine-5-carboxylic acid A suspension of 30 g. of 1-ethyl-4-[2-(4-chlorobenzylidene)hydrazino]-1H-pyrazolo[3,4-b]pyridine-5-carboxylic acid ethyl ester (0.081 mol.) in 500 ml. of aqueous sodium hydroxide (32 g/l) and 600 ml. of ethanol is stirred at 80° until the ester has dissolved. After removal of ethanol, the clear solution is acidified with diluted aqueous acetic acid (25%) to yield 27.4 g. (97%) of 1-ethyl-4-[2-(4-chlorobenzyllidene)hydrazino]-1H-pyrazolo[3,4-b]pyridine-5-carboxylic acid that, after recrystallization from dioxane, melts at 229°–231°C. (dec.).

c. 1-Ethyl-4-[2-(4-chlorobenzylidene)hydrazino]-1H-pyrazolo[3,4-b]pyridine 17 g. of 1-ethyl-4-[2-(4-chlorobenzylidene)hydrazino]1H-pyrazolo[3,4-b]pyridine-5-carboxylic acid (0.05 mol.) suspended in 300 ml. of nitrobenzene, are heated at 200°–210°C. (bath temperature) for 2 hours. After removal of the nitrobenzene, the residue is treated with ether and the 1-ethyl-4-2-(4-chlorobenzylidene)hydrazino]-1H-pyrazolo[3,4-b]pyridine is filtered off yielding 10 g. (67%); m.p. 242°–243°C. (acetonitrile).

EXAMPLE 3

1-Ethyl-4-[2-(isopropylidene)hydrazino]-3-methyl-1H-pyrazolo[3,4-b]pyridine a. 1-Ethyl-4-[2-(isopropylidene)hydrazino]-3-methyl-1H-pyrazolo[3,4-b]pyridine-5-carboxylic acid 21.6 g. of 1-ethyl-4-[2-(isopropylidene)hydrazino]-3-methyl-1H-pyrazolo[3,4-b]pyridine-5-carboxylic acid ethyl ester [(J. Heterocycl. Chemie 9, 235 (1972)] suspended in a solution of 400 ml. of ethanol and 500 ml. of aqueous sodium hydroxide (28.4 g/l) is stirred at room temperature until the ester is dissolved (about 45 hours). After removal of the ethanol in vacuo, the clear solution is acidified with dilute aqueous acetic acid separating the crystalline 1-ethyl-4-[2-(isopropylidene)hydrazino]-3-methyl-1H-pyrazolo[3,4-b]pyridine-5-carboxylic acid, yield 18.3 g. (94%); m.p. 218°–219°C. (dec.) (ethanol).

b. 1-Ethyl-4-[2-(isopropylidene)hydrazino]-3-methyl-1H-pyrazolo[3,4-b]pyridine 18.3 g. of 1-ethyl-4-[2-(isopropylidene)hydrazino]-3-methyl-1H-pyrazolo[3,4-b]pyridine-5-carboxylic acid are heated at 220°C. (bath temperature) for 15 minutes. After cooling, the solid 1-ethyl-4-[2-(isopropylidene)hydrazino]-3-methyl-1H-pyrazolo[3,4-b]pyridine (14 g.=92%) is recrystallized from ethyl acetate, m.p. 141.5°–142.5°C.

EXAMPLE 4

1-Ethyl-3-methyl-4-[2-(benzylidene)hydrazino]-1H-pyrazolo[3,4-b]pyridine

1-Ethyl-3-methyl-4-[2-(benzylidene)hydrazino]-1H-pyrazolo[3,4-b]pyridine-5-carboxylic acid ethyl ester [(m.p. 161°–162°C), prepared according to J. Heterocycl. Chemie 9, 235 (1972)], is saponified with sodium hydroxide as in Example 3a to give 1-ethyl-3-methyl-4-[2-(benzylidene)hydrazino]-1H-pyrazolo[3,4-b]pyridine-5-carboxylic acid, m.p. 199°–201°C. (dioxane). Decarboxylation of the acid at 230° (bath temperature) gives 1-ethyl-3-methyl-4-[2-(benzylidene)hydrazino]-1H-pyrazolo[3,4-b]pyridine which is dissolved in ether. Addition of ethereal hydrochloride acid separates the hydrochloride, m.p. 275°–277° (absolute ethanol); yield 83%.

The following additional products are made by the procedure of Example 3.

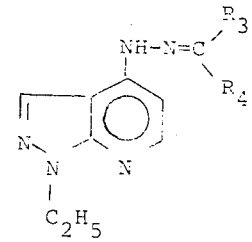

| Example | $R_3$ | $R_4$ | Salt | m.p. |
|---|---|---|---|---|
| 5 | $C_2H_5$ | $CH_3$ | HCl | 189–190° |
| 6 | n—$C_4H_9$ | n—$C_4H_9$ | HCl | 169–170° |
| 7 | ⌬ | H | — | 160–161° |
| 8 | $CH_2—CH_2—CH_2—CH_2—CH_2$ | | HCl | 216–218° |

The following additional products are obtained by decarboxylating according to the procedure of Example 4 the carboxylic acid ester (produced as described in U.S. Pat. No. 3,773,777):

EXAMPLE 9

4-[2-(benzylidene)hydrazino]-1-ethyl-1H-pyrazolo[3,4-b]pyridine-5-carboxylic acid, ethyl ester (m.p.225°–226°) is decarboxylated to yield 4-[2-(benzylidene)hydrazino]-1-ethyl-1H-pyrazolo-[3,4-b]pyridine.

EXAMPLE 10

4-[2-(isopropylidene)hydrazino]-1-methyl-1H-pyrazolo[3,4-b]pyridine-5-carboxylic acid, ethyl ester is decarboxylated to yield 4-[2-(isopropylidene)hydrazino]-1-methyl-1H-pyrazolo[3,4-b]pyridine.

EXAMPLE 11

1-isopropyl-4-[2-(isopropylidene)hydrazino]-1H- pyrazolo[3,4-b]pyridine-5-carboxylic acid, ethyl ester is decarboxylated to yield 1-isopropyl-4-[2-(isopropylidene)hydrazino]-1H-pyrazolo[3,4-b]pyridine.

EXAMPLE 12

1-ethyl-4-[2-(isopropylidene)hydrazino]-6-methyl-1H-pyrazolo[3,4-b]pyridine-5-carboxylic acid, ethyl ester is decarboxylated to yield 1-ethyl-4-[2-(isopropylidene)hydrazino]-6-methyl-1H-pyrazolo[3,4-b]pyridine.

EXAMPLE 13

1-ethyl-4-[2-(isopropylidene)hydrazino]-6-phenyl-1H-pyrazolo[3,4-b]pyridine-5-carboxylic acid, ethyl ester is decarboxylated to yield 1-ethyl-4-[2-(isopropylidene)hydrazino]-6-phenyl-1H-pyrazolo[3,4-b]pyridine.

EXAMPLE 14

1-benzyl-6-ethyl-4-[2-(propylidene)hydrazino]-1H-pyrazolo[3,4-b]pyridine is obtained by decarboxylating 1-benzyl-6-ethyl-4-[2-(propylidene)hydrazino]-1H-pyrazolo[3,4-b]pyridine-5-carboxylic acid, methyl ester according to the procedure of Example 4.

EXAMPLE 15

1-phenethyl-4-[2-(ethylidene)hydrazino]-3-ethyl-1H-pyrazolo[3,4-b]pyridine is obtained by the procedure of Example 1 by substituting 5-amino-3-ethyl-1-phenethylpyrazole for the 5-amino-1-ethyl-3-methylpyrazole and acetoacetic acid ethyl ester for the benzoylacetic acid ethyl ester in part *a* and substituting acetaldehyde for benzaldehyde in part *d*.

EXAMPLE 16

1,3-diethyl-6-phenyl-4-[2-(benzylidene)hydrazino]-1H-pyrazolo[3,4-b]pyridine is obtained by the procedure of Example 1 by substituting 5-amino-1,3-diethylpyrazole for the 5-amino-1-ethyl-3-methylpyrazole in part *a*.

EXAMPLE 17

1-ethyl-4-[2-(ethylpropylidene)hydrazino]-3,6-dimethyl-1H-pyrazolo[3,4-b]pyridine is obtained by the procedure of Example 2 by substituting diethyl ketone for the p-chlorobenzaldehyde.

EXAMPLE 18

1-ethyl-4-[2-(cyclopropylidene)hydrazino]-1H-pyrazolo[3,4-b]pyridine is obtained by the procedure of Example 2 by substituting cyclopropanone for the p-chlorobenzaldehyde.

EXAMPLE 19

1-ethyl-4[2-(cyclopentylidene)hydrazino]-1H-pyrazolo[3,4-b]pyridine is obtained by the procedure of Example 2 by substituting cyclopentanone for the p-chlorobenzaldehyde.

EXAMPLE 20

1-ethyl-4-[2-(3-bromobenzylidene)hydrazino]-1H-pyrazolo[3,4-b]pyridine is obtained by the procedure of Example 2 by substituting m-bromobenzaldehyde for the p-chlorobenzaldehyde.

EXAMPLE 21

1-ethyl-4-[2-(2-methylbenzylidene)hydrazino]-1H-pyrazolo[3,4-b]pyridine is obtained by the procedure of Example 2 by substituting o-tolualdehyde for the p-chlorobenzaldehyde.

EXAMPLE 22

1-ethyl-4-[2-(2-carboxybenzylidene)hydrazino]-1H-pyrazolo[3,4-b]pyridine is obtained by the procedure of Example 2 by substituting o-carboxybenzaldehyde for the p-chlorobenzaldehyde.

What is claimed is:

1. A compound of the formula

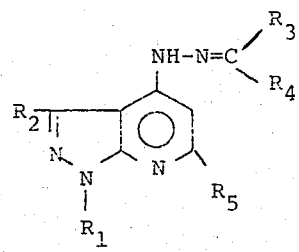

wherein $R_1$ is lower alkyl or phenyl-lower alkyl; $R_2$ is hydrogen or lower alkyl, $R_3$ is lower alkyl, phenyl or substituted phenyl; $R_4$ is hydrogen, lower alkyl, phenyl or substituted phenyl, said phenyl substituents being halogen, lower alkyl or carboxy; or $R_3$ and $R_4$ together complete a $C_3$ to $C_6$ cycloalkyl ring; and $R_5$ is hydrogen, lower alkyl or phenyl; and physiologically acceptable acid addition salts thereof.

2. A compound as in claim 1 wherein $R_1$ is lower alkyl; $R_2$ and $R_3$ each is hydrogen or lower alkyl; $R_4$ is lower alkyl or phenyl; and $R_5$ is hydrogen, methyl or phenyl.

3. A compound as in claim 1 wherein $R_1$, $R_3$ and $R_4$ each is lower alkyl and $R_2$ and $R_5$ each is hydrogen.

4. A compound as in claim 1 wherein $R_1$, $R_2$, $R_3$ and $R_4$ each is lower alkyl and $R_5$ is hydrogen.

5. A compound as in claim 1 wherein $R_1$ is lower alkyl, $R_2$, $R_4$ and $R_5$ each is hydrogen and $R_3$ is phenyl.

6. A compound as in claim 1 wherein $R_1$ and $R_2$ each is lower alkyl, $R_3$ is phenyl and $R_4$ and $R_5$ each is hydrogen.

7. A compound as in claim 1 wherein $R_1$ and $R_2$ each is lower alkyl, $R_3$ and $R_5$ each is phenyl and $R_4$ is hydrogen.

8. A compound as in claim 1 wherein $R_1$ is ethyl, $R_2$ is methyl, $R_3$ and $R_5$ each is phenyl and $R_4$ is hydrogen.

9. A compound as in claim 1 wherein $R_1$ is ethyl, $R_2$, $R_4$ and $R_5$ each is hydrogen and $R_3$ is p-chlorophenyl.

10. A compound as in claim 1 wherein $R_1$ is ethyl, $R_2$, $R_3$ and $R_4$ each is methyl and $R_5$ is hydrogen.

11. A compound as in claim 1 wherein $R_1$ is ethyl, $R_2$ is methyl, $R_3$ is phenyl and $R_4$ and $R_5$ each is hydrogen.

12. A compound as in claim 1 wherein $R_1$ is ethyl, $R_2$ and $R_5$ each is hydrogen and $R_3$ and $R_4$ together with the carbon to which they are attached form a cyclohexyl ring.

* * * * *